US012544786B2

(12) United States Patent
Nagai et al.

(10) Patent No.: US 12,544,786 B2
(45) Date of Patent: Feb. 10, 2026

(54) METHOD FOR PRODUCING REPAIR SHEET AND METHOD FOR MANAGING REPAIR SHEET

(71) Applicant: TOYOTA JIDOSHA KABUSHIKI KAISHA, Toyota (JP)

(72) Inventors: Takayuki Nagai, Toyota (JP); Eisaku Okada, Toyota (JP); Shuji Nakagawa, Toyota (JP); Kazuhide Tabata, Toyota (JP); Masao Hayashida, Toyota (JP); Keisuke Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/360,270

(22) Filed: Jul. 27, 2023

(65) Prior Publication Data

US 2024/0042484 A1 Feb. 8, 2024

(30) Foreign Application Priority Data

Aug. 2, 2022 (JP) ................................ 2022-123602

(51) Int. Cl.
*B05D 5/00* (2006.01)
*B05D 7/00* (2006.01)

(52) U.S. Cl.
CPC ............. *B05D 5/005* (2013.01); *B05D 7/532* (2013.01)

(58) Field of Classification Search
CPC ......... B05D 5/005; B05D 7/532; B05D 5/061
See application file for complete search history.

(56) References Cited

U.S. PATENT DOCUMENTS

2008/0314500 A1* 12/2008 Boers ....................... B05D 5/06 156/60
2009/0274827 A1 11/2009 Anderson et al.

FOREIGN PATENT DOCUMENTS

CN 102549545 A 7/2012
JP 10-220033 A 8/1998
JP H10220033 A * 8/1998
JP 2009-515678 A 4/2009

OTHER PUBLICATIONS

JP-H10220033-A English translation. (Year: 1997).*
JP-H10220033-A English translation. (Year: 1998).*

* cited by examiner

*Primary Examiner* — Hai Y Zhang
(74) *Attorney, Agent, or Firm* — Sughrue Mion, PLLC

(57) ABSTRACT

The method for producing a repair sheet includes: attaching a nonpolar resin plate to an appropriate position on a dummy vehicle body corresponding to a repair area including a coating film in need of repair; supplying the dummy vehicle body to a topcoat application line and forming a pigment layer on a nonpolar resin plate and a clear layer on a nonpolar resin plate under a condition equal to that for topcoat application to a vehicle body to be actually coated; and supplying the dummy vehicle body to a coating drying line and drying the nonpolar resin plate having the pigment layer and the nonpolar resin plate having the clear layer formed thereon under a condition equal to that for coating drying of the vehicle body to be actually coated.

2 Claims, 11 Drawing Sheets

METHOD FOR PRODUCING REPAIR SHEET AND METHOD FOR MANAGING REPAIR SHEET

CROSS REFERENCE TO RELATED APPLICATIONS

The present application claims priority from Japanese patent application JP 2022-123602 filed on Aug. 2, 2022, the entire content of which is hereby incorporated by reference into this application.

BACKGROUND

Technical Field

The present disclosure relates to a method for producing a repair sheet for repair of a coating film of a vehicle body and a method for managing a repair sheet.

Background Art

A method for producing a repair sheet for repair of a damaged portion of a coating film is disclosed in JP H10-220033 A, for example. JP H10-220033 A discloses a method for producing a repair sheet by sequentially forming a base layer, a pattern layer, and a clear layer on a peelable surface using a paint having the same composition as a damaged coating film and then drying the formed layers. When the damaged portion of the coating film is repaired, the produced repair sheet is cut into an appropriate size and bonded to the damaged portion using an adhesive agent.

SUMMARY

However, even when a paint having the same composition as the damaged coating film is used, the color of the produced repair sheet may change due to differences in drying conditions and the like. For this reason, it is difficult to repair the damaged portion without causing a sense of incompatibility.

The present disclosure has been made in view of the foregoing, and provides a method for producing a repair sheet that can achieve repair without causing a sense of incompatibility, and a method for managing a repair sheet.

A method for producing a repair sheet according to the present disclosure is a method for producing a repair sheet for repair of a coating film of a vehicle body, including: a first step of detachably attaching a nonpolar resin plate to an appropriate position on a dummy vehicle body corresponding to a repair area including a coating film in need of repair; a second step of supplying the dummy vehicle body to a topcoat application line and forming either a pigment layer or a clear layer, or both of the pigment layer and the clear layer on the nonpolar resin plate under a condition equal to that for topcoat application to a vehicle body to be actually coated; and a third step of supplying the dummy vehicle body to a coating drying line and drying the nonpolar resin plate having either the pigment layer or the clear layer formed thereon or having both of the pigment layer and the clear layer formed thereon under a condition equal to that for coating drying of the vehicle body to be actually coated.

According to the method for producing a repair sheet of the present disclosure, by forming and drying either a pigment layer or a clear layer, or both of the pigment layer and the clear layer on a nonpolar resin plate under conditions equal to those for topcoat application and coating drying of a vehicle body to be actually coated, it is possible to produce a repair sheet having a color close to a coating color of the vehicle body to be actually coated. Additionally, since the topcoat application and the coating drying are performed with the nonpolar resin plate being attached to an appropriate position on a dummy vehicle body corresponding to a repair area including a coating film in need of repair, it is possible to avoid color variations due to different positions, and to produce a repair sheet having a color substantially equal to the coating color of the vehicle body to be actually coated. Using such a produced repair sheet for repair can achieve repair without causing a sense of incompatibility.

In the method for producing a repair sheet according to the present disclosure, in the second step, when forming the pigment layer or both of the pigment layer and the clear layer on the nonpolar resin plate, the pigment layer may be formed to have a varying thickness. By forming a pigment layer to have a varying thickness, it is possible to give gradations in color of the repair sheet. As a result, from the repair sheet, a portion that matches the color of the coating film in need of repair can be selected, and the selected portion can be used for repair, so that toning of the coating film in need of repair can be easily performed, thus further achieving repair without causing a sense of incompatibility.

A method for managing a repair sheet according to the present disclosure includes managing by associating vehicle lot information including information about a paint applied to a vehicle body with repair sheet lot information including information about a paint used in a repair sheet for repair of a coating film of a vehicle body.

Since the method for managing a repair sheet according to the present disclosure manages a repair sheet by associating vehicle lot information with repair sheet lot information, it is possible to identify the vehicle lot information based on the vehicle including a coating film in need of repair and further identify the repair sheet lot information based on the vehicle lot information. As a result, it is possible to facilitate search for the repair sheet corresponding to the coating film in need of repair and easily perform toning of the coating film in need of repair.

According to the present disclosure, it is possible to achieve repair without causing a sense of incompatibility.

DETAILED DESCRIPTION

Hereinafter, a method for producing a repair sheet and a method for managing a repair sheet according to the present disclosure will be described with reference to the drawings. In the description of the drawings, identical elements are denoted by identical reference signs, and repeated description thereof will be omitted.

Regarding Method for Producing Repair Sheet

First, a method for producing a repair sheet will be described.

First Embodiment

Figure 1:
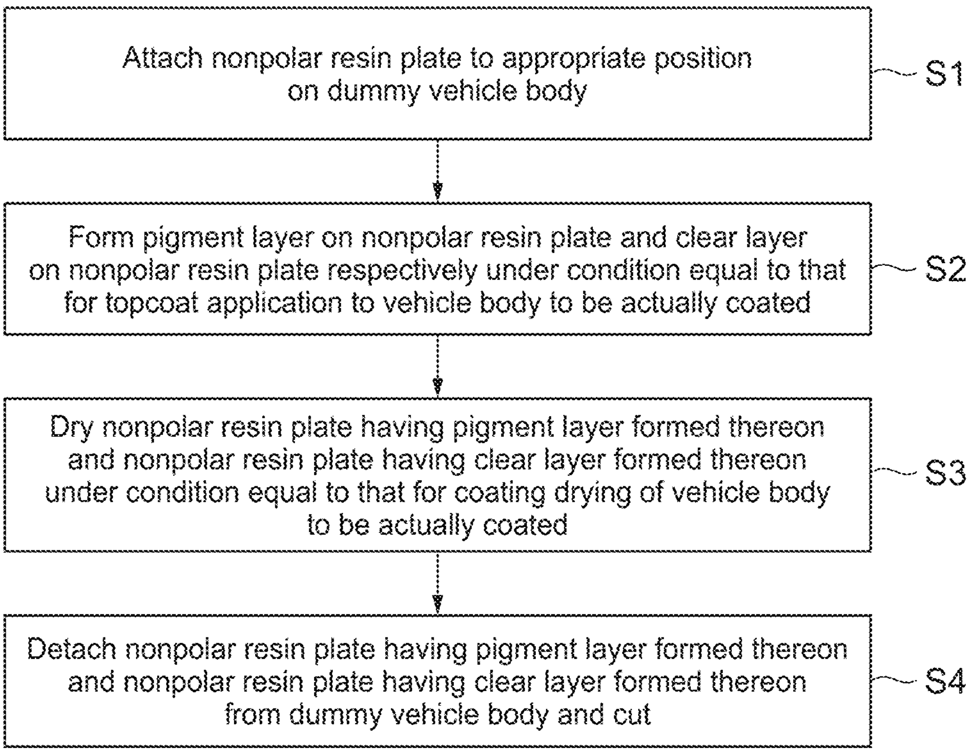
FIG. 1 is a flowchart of a method for producing a repair sheet according to a first embodiment.

A first embodiment of the method for producing a repair sheet will be described based on FIG. 1 to FIG. 5. The method for producing a repair sheet according to the present embodiment is a method for producing a repair sheet that is used for repair of a coating film of a vehicle body. As shown in FIG. 1, this method for producing a repair sheet includes a first step S1 of attaching a nonpolar resin plate to an appropriate position on a dummy vehicle body, a second step S2 of forming a pigment layer on a nonpolar resin plate and a clear layer on a nonpolar resin plate, respectively, under a condition equal to that for topcoat application to a vehicle body to be actually coated, a third step S3 of drying the nonpolar resin plate having the pigment layer formed thereon and the nonpolar resin plate having the clear layer formed thereon under a condition equal to that for coating drying of the vehicle body to be actually coated, and a fourth step S4 of detaching the nonpolar resin plate having the pigment layer formed thereon and the nonpolar resin plate having the clear layer formed thereon from the dummy vehicle body and cutting. These steps will be described in detail below.

In the first step S1, an operator detachably attaches a nonpolar resin plate to an appropriate position on a dummy vehicle body corresponding to a repair area including a coating film in need of repair. The area described herein means a vehicle body area, i.e., a part of a vehicle body that can be visually recognized on the exterior appearance (i.e., being visually recognizable from the outside of the vehicle), including a front door, a rear door, a hood, a roof, a trunk lid, a front fender, a rear fender, a front pillar, a center pillar, and a rear pillar, for example. In the present embodiment, by way of example, repair of a damaged portion (for example, scratches) of the coating film on the front door will be described. Thus, the coating film in need of repair is the coating film on the front door.

Figure 2A:
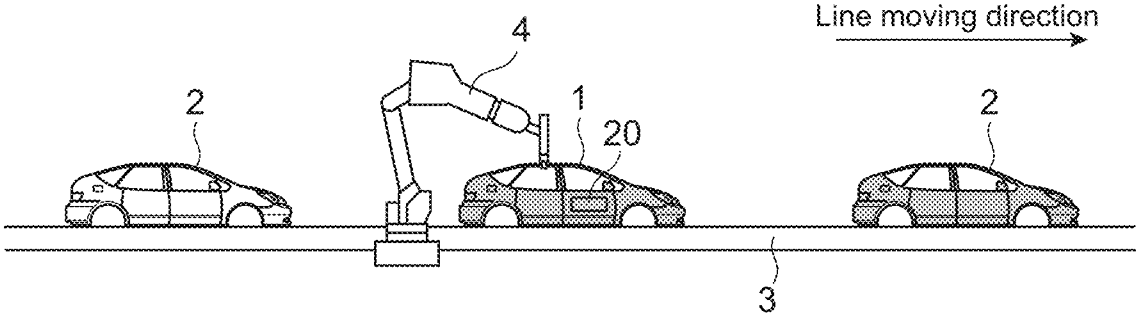
FIG. 2A is a schematic diagram showing the method for producing a repair sheet according to the first embodiment.

As shown in FIG. 2A, a dummy vehicle body 1 may be identical to a vehicle body 2 to be actually manufactured (i.e., a vehicle body 2 to be actually coated) or may have a structure different from that of the vehicle body 2 to be actually manufactured other than the above-mentioned vehicle body area. That is, the dummy vehicle body 1 may be of the same model having the same shape and dimension as the vehicle body 2 to be actually coated as a product, or may be a vehicle body including the vehicle body areas, such as a front door, a rear door, a hood, a roof, a trunk lid, a front fender, a rear fender, a front pillar, a center pillar, and a rear pillar, that are equal in shape and dimension to those of the vehicle body 2 to be actually coated as a product, but including other parts having different shapes and dimensions from those of the vehicle body 2 to be actually coated as a product.

The nonpolar resin plate 20 is a thin plate formed of the so-called difficult-to-bond plastics that will not adhere to a pigment layer or a clear layer to be formed thereon. The nonpolar resin may be at least one selected from the group consisting of a polypropylene resin, a polyolefin resin, a polydiene resin, a polystyrene resin, an ethylene-vinyl acetate copolymer, a styrene copolymer rubber, a styrene thermoplastic elastomer, and a natural rubber. Use of such a nonpolar resin plate 20 allows support of the formed pigment layer or clear layer and easy separation of the formed pigment layer or clear layer (that is, the formed pigment layer or clear layer can be easily peeled off the nonpolar resin plate 20).

As described above, since the coating film in need of repair is the coating film on the front door, the operator detachably attaches the nonpolar resin plate 20 to the front door of the dummy vehicle body 1 (see FIG. 2A). The operation of attaching the nonpolar resin plate is carried out at a temporary holding place for vehicle bodies, for example. In addition, the nonpolar resin plate 20 is attached to the dummy vehicle body 1 using a wire or jig, for example, to later easily detach the nonpolar resin plate 20 from the dummy vehicle body 1. In addition, unlike the usual coating of a plastic bumper, an adhesive agent such as a primer will not be applied to the nonpolar resin plate 20 to easily peel the formed pigment layer or clear layer off the nonpolar resin plate 20.

In the second step S2, first, the operator supplies the dummy vehicle body 1 to which the nonpolar resin plate 20 has been attached to a topcoat application line 3. At this time, based on production plan information for the day, for example, the operator may introduce the dummy vehicle body 1 between the adjacent vehicle bodies 2 to be actually coated as a product or may introduce the dummy vehicle body 1 to follow the last vehicle body to be coated for the day.

Next, a pigment layer is formed on the nonpolar resin plate 20 and a clear layer is formed on the nonpolar resin plate 20, respectively, under a condition equal to that for topcoat application to the vehicle body 2 to be actually coated. That is, the pigment layer and the clear layer are formed separately under the same condition as the vehicle body 2 to be actually coated as a product with respect to the nonpolar resin plates 20 that have been attached to the dummy vehicle body 1. The same condition as described herein means that all the paints used, the facilities such as an automatic coating machine 4, the coating conditions, and the coating booth environment are the same.

Figure 3:
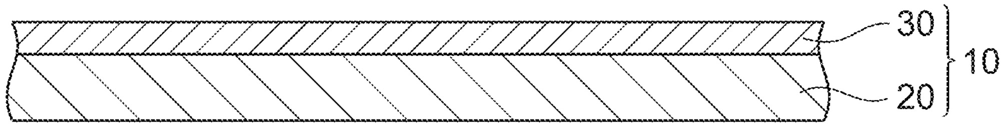
FIG. 3 is a cross-sectional view of a repair sheet including a nonpolar resin plate and a pigment layer.
Figure 4:
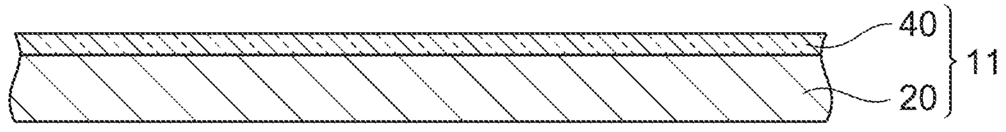
FIG. 4 is a cross-sectional view of a repair sheet including a nonpolar resin plate and a clear layer.

In the present embodiment, as shown in FIG. 3 and FIG. 4, a pigment layer 30 and a clear layer 40 are formed on the different nonpolar resin plates 20 that are separately prepared (in more detail, on the outer surface of the nonpolar resin plate 20). Thus, for example, the pigment layer 30 is formed on the nonpolar resin plate 20 attached to the front door on the left side of the dummy vehicle body 1 and the clear layer 40 is formed on the nonpolar resin plate 20 attached to the front door on the right side of the dummy vehicle body 1. Accordingly, when forming the pigment layer 30, the automatic coating machine 4 on the right side of the topcoat application line 3 is stopped, and coating is performed on the nonpolar resin plate 20 attached to the front door on the left side using the automatic coating machine 4 on the left side. When forming the clear layer 40, the automatic coating machine 4 on the left side of the topcoat application line 3 is stopped, and coating is performed on the nonpolar resin plate 20 attached to the front door on the right side using the automatic coating machine 4 on the right side.

The pigment layer 30 is also referred to as a base layer, and includes a coloring pigment. This pigment layer 30 may have a single-layer structure or a multi-layer structure. Meanwhile, the clear layer 40 is a transparent layer not including a coloring pigment to enhance a glossy appearance and a high quality appearance of the coating film while increasing weather resistance, chemical resistance, and the like of the pigment layer 30.

In the third step S3, the operator supplies the dummy vehicle body 1 to a coating drying line and dries the nonpolar resin plate 20 having the pigment layer 30 formed thereon and the nonpolar resin plate 20 having the clear layer 40 formed thereon under the same condition as that for coating drying of the vehicle body 2 to be actually coated. For example, the operator introduces the dummy vehicle body 1 having finished its topcoat application into a heat-drying booth and dries the nonpolar resin plate 20 having the pigment layer 30 formed thereon and the nonpolar resin plate 20 having the clear layer 40 formed thereon under the same condition as the vehicle body 2 to be actually coated as a product. It should be noted that the same condition as described herein means that all the facilities installed in the heat-drying booth, the drying temperature, and the drying time are the same.

Figure 2B:
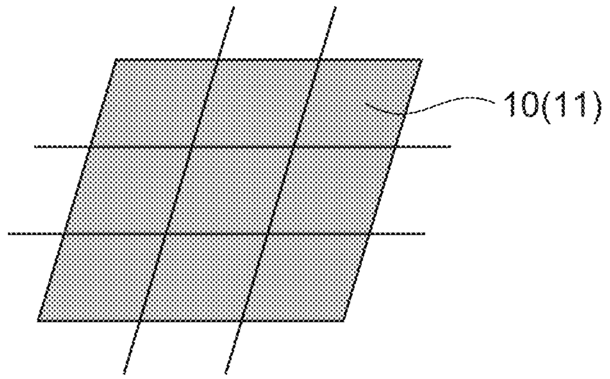
FIG. 2B is a schematic diagram showing cutting of the repair sheet according to the first embodiment.

In the fourth step S4, the operator introduces the dried dummy vehicle body 1 into the temporary holding place for vehicle bodies, for example, detaches from the dummy vehicle body 1 the nonpolar resin plate 20 having the pigment layer 30 formed thereon and the nonpolar resin plate 20 having the clear layer 40 formed thereon, and cuts each of them into a predetermined size by laser or the like (see FIG. 2B). Consequently, a repair sheet 10 including the nonpolar resin plate 20 and the pigment layer 30 (see FIG. 3) and a repair sheet 11 including the nonpolar resin plate 20 and the clear layer 40 (see FIG. 4) are produced separately.

According to the method for producing a repair sheet of the present embodiment, by forming and drying the pigment layer 30 on the nonpolar resin plate 20 and the clear layer 40 on the nonpolar resin plate 20, respectively, under the same conditions as those for the topcoat application and coating drying of the vehicle body 2 to be actually coated, it is possible to produce the repair sheets 10, 11 having a color close to the coating color of the vehicle body 2 to be actually coated. Additionally, since the topcoat application and the coating drying are performed with the nonpolar resin plate 20 being attached to an appropriate position on the dummy vehicle body 1 corresponding to a repair area including a coating film in need of repair, it is possible to avoid color variations due to different arrangement positions such as a horizontal arrangement or a vertical arrangement, and to produce the repair sheets 10, 11 having a color substantially equal to the coating color of the vehicle body 2 to be actually coated. Using such produced repair sheets 10, 11 to repair the damaged portion of the coating film can achieve repair without causing a sense of incompatibility.

Figure 2C:
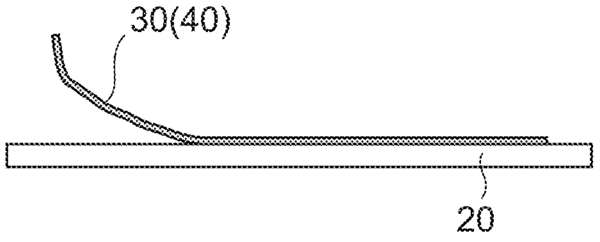
FIG. 2C is a schematic diagram showing peeling a pigment layer or a clear layer off a nonpolar resin plate.
Figure 2D:
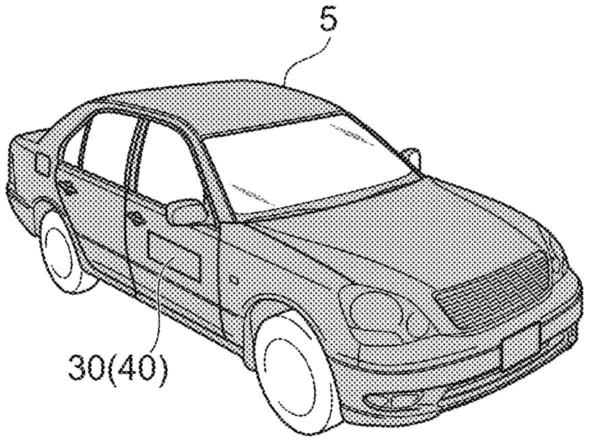
FIG. 2D is a schematic diagram showing bonding a pigment layer and a clear layer to a repair area.

It should be noted that when the damaged portion of the coating film on the front door is repaired using the produced repair sheets 10, 11, as shown in FIG. 2C and FIG. 2D, first, the pigment layer 30 is peeled off the nonpolar resin plate 20 of the repair sheet 10, and then the pigment layer 30 is bonded to the front door of the vehicle 5 in need of repair using an adhesive agent or the like. Next, the clear layer 40 is peeled off the nonpolar resin plate 20 of the repair sheet 11, and then the clear layer 40 is bonded onto the pigment layer 30 using an adhesive agent or the like so as to cover the pigment layer 30 bonded to the front door.

Figure 5:
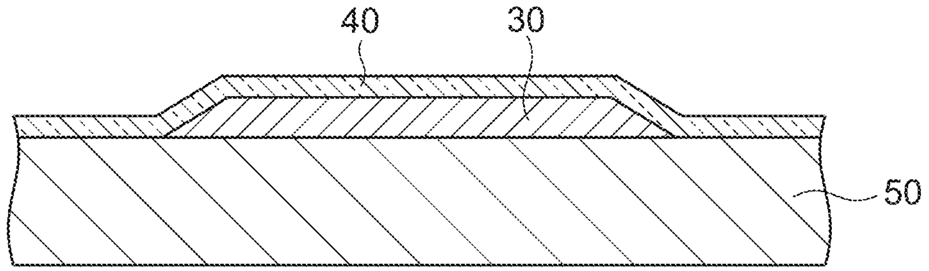
FIG. 5 is a cross-sectional view showing the arrangement of a pigment layer and a clear layer when a coating film of a vehicle body is repaired.

Then, when the clear layer 40 is bonded onto the pigment layer 30, as shown in FIG. 5, the clear layer 40 may be prepared to have a size greater than that of the pigment layer 30 bonded to the front door 50, and the clear layer 40 may be bonded to the pigment layer 30 and the front door 50 so as to cover the pigment layer 30 and directly contact the front door 50 at an edge portion of the clear layer 40. Furthermore, the edge portion of the clear layer 40 directly contacting the front door 50 may be heated to conform to the surrounding portion. This causes the edge end of the repaired area to include only the clear layer 40, thus making the thickness smaller as compared to the thickness when the edge end of the repaired area includes both the pigment layer 30 and the clear layer 40. As a result, the edge end of the repaired area becomes less noticeable and produces the effect of reducing the visibility of the repaired area, thus further achieving repair without causing a sense of incompatibility.

It should be noted that production of the repair sheet 11 including the nonpolar resin plate 20 and the clear layer 40 is not always needed. For example, when spray coating is performed for the clear layer at a repair operation site, only the repair sheet 10 including the nonpolar resin plate 20 and the pigment layer 30 may be produced.

Second Embodiment

Next, a method for producing a repair sheet according to a second embodiment will be described based on FIG. 6. The method for producing a repair sheet of the present embodiment differs from the first embodiment in forming a pigment layer 31 having a two-layer structure. The following describes only the difference.

Figure 6:
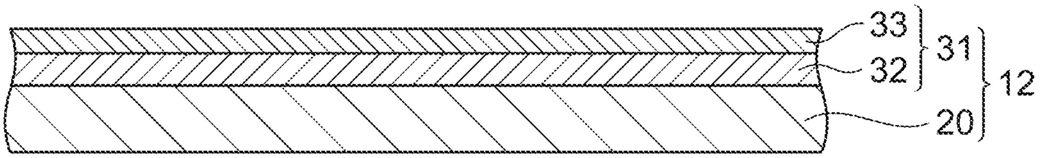
FIG. 6 is a cross-sectional view showing production of a repair sheet according to a second embodiment.

As shown in FIG. 6, the pigment layer 31 of the present embodiment includes a color layer 32 formed on the nonpolar resin plate 20 and a color clear layer 33 formed on the color layer 32. Thus, in the second step, when the pigment layer 31 is formed on the nonpolar resin plate 20 under the same condition as that for the topcoat application to the vehicle body 2 to be actually coated, first, the color layer 32 is formed on the nonpolar resin plate 20 and then the color clear layer 33 is further formed on the formed color layer 32. Consequently, a repair sheet 12 including the nonpolar resin plate 20, the color layer 32, and the color clear layer 33 is produced.

According to the method for producing a repair sheet of the present embodiment, it is possible to obtain the same operational effect as that of the foregoing first embodiment. Additionally, since the pigment layer 31 has a two-layer structure (i.e., the color layer 32 and the color clear layer 33), it is possible to increase the number of variations in pigment layers, allowing for easier color adjustment.

Then, when the damaged portion of the coating film on the front door is repaired using the produced repair sheet 12, the pigment layer 31 including the color layer 32 and the color clear layer 33 may be together peeled off the nonpolar resin plate 20 and then bonded to the front door of the vehicle 5 in need of repair, and further the clear layer 40 may be bonded thereon.

Third Embodiment

Figure 7:
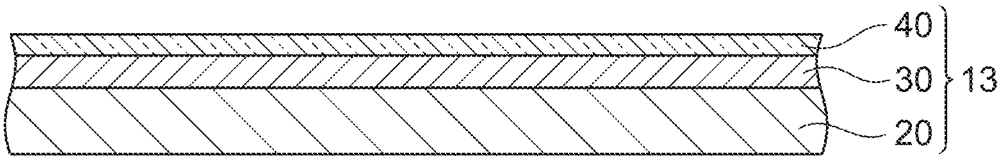
FIG. 7 is a cross-sectional view showing production of a repair sheet according to a third embodiment.

Next, a method for producing a repair sheet according to a third embodiment will be described based on FIG. 7. The method for producing a repair sheet of the present embodiment differs from the first embodiment in forming a pigment layer 30 and a clear layer 40 on the same nonpolar resin plate 20. The following describes only the difference.

That is, in the second step S2, under the same condition as that for the topcoat application to the vehicle body 2 to be actually coated, first, a pigment layer 30 is formed on a nonpolar resin plate 20. After that, a clear layer 40 is further formed on the formed pigment layer 30. Consequently, a repair sheet 13 including the nonpolar resin plate 20, the pigment layer 30, and the clear layer 40 is produced.

According to the method for producing a repair sheet of the present embodiment, it is possible to obtain the same operational effect as that of the foregoing first embodiment. Additionally, since the pigment layer 30 and the clear layer 40 are formed on the same nonpolar resin plate 20, when the damaged portion of the coating film is repaired using the produced repair sheet 13, the pigment layer 30 and the clear layer 40 are together peeled off the nonpolar resin plate 20 and then bonded to the front door of the vehicle 5 in need of repair. This can make the repair operation time shorter as compared to the first embodiment in which the pigment layer 30 and the clear layer 40 are formed separately on the different nonpolar resin plates 20.

Fourth Embodiment

Figure 8:
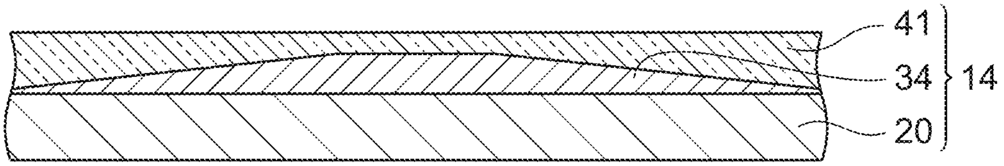
FIG. 8 is a cross-sectional view showing production of a repair sheet according to a fourth embodiment.

Next, a method for producing a repair sheet according to a fourth embodiment will be described based on FIG. 8. The method for producing a repair sheet of the present embodiment differs from the first embodiment in forming a pigment layer 34 and a clear layer 41 on the same nonpolar resin plate 20 and forming the pigment layer 34 so as to have a varying thickness. The following describes only the differences.

That is, in the second step S2, under the same condition as that for the topcoat application to the vehicle body 2 to be actually coated, first, a pigment layer 34 is formed on a nonpolar resin plate 20. At that time, the pigment layer 34 is formed to have a gradually reduced thickness from the central portion toward the opposite end portions in a longitudinal direction of the nonpolar resin plate 20 along the front-rear direction of the vehicle body, for example. After that, a clear layer 41 is further formed on the formed pigment layer 34. It should be noted that when forming the clear layer 41, the thickness of the clear layer 41 may be adjusted such that the total thickness of the pigment layer 34 and the clear layer 41 is substantially uniform in the longitudinal direction of the nonpolar resin plate 20. Consequently, a repair sheet 14 including the nonpolar resin plate 20, the pigment layer 34, and the clear layer 41 is produced.

According to the method for producing a repair sheet of the present embodiment, it is possible to obtain the same operational effect as that of the foregoing first embodiment. Additionally, since the pigment layer 34 and the clear layer 41 are formed on the nonpolar resin plate 20, when the coating film of the vehicle body is repaired using the produced repair sheet 14, the pigment layer 34 and the clear layer 41 are together peeled off the nonpolar resin plate and then bonded to the front door of the vehicle 5 in need of repair. This can make the repair operation time shorter as compared to the first embodiment in which the pigment layer and the clear layer 40 are formed separately on the different nonpolar resin plates 20.

Furthermore, since the formed pigment layer 34 has a gradually reduced thickness from the central portion toward the opposite end portions, it is possible to give gradations in color of the produced repair sheet 14. As a result, from the repair sheet 14, a portion that matches the color of the coating film in need of repair can be selected, and the selected portion can be used for repair, so that toning of the coating film in need of repair can be easily performed. That is, from the repair sheet 14, a gradation that is the closet to the color of the coating film in need of repair can be selected, and the selected portion can be used for repair of the damaged portion of the coating film, thus further achieving repair without causing a sense of incompatibility.

Method for Managing Repair Sheet

Next, a method for managing a repair sheet will be described. In the method for managing the repair sheets 10, 11, 12, 13, 14 according to the embodiments, vehicle lot information including information about a paint applied to the vehicle body 2 is associated with repair sheet lot information including information about a paint used in the repair sheet for repair of the coating film of the vehicle body 2 for management. The information about a paint includes information such as a paint lot number, a date of use of the paint, for example. In the present embodiment, using an information processing device including a computer and the like, for example, vehicles and repair sheets having the same paint lot number and the same date of use are managed in association with each other.

Since this allows management by associating vehicle lot information with repair sheet lot information, it is possible to identify the vehicle lot information based on the vehicle including a coating film in need of repair and identify the repair sheet lot information based on the identified vehicle lot information. As a result, it is possible to facilitate search for the repair sheets 10, 11, 12, 13, 14 corresponding to the coating film in need of repair and easily perform toning of the coating film in need of repair.

Although the embodiments of the present disclosure have been described in detail above, the present disclosure is not limited to the above embodiments, and various design changes are possible in so far as they are within the spirit of the present disclosure in the scope of the claims.

What is claimed is:

1. A method for producing a repair sheet for repair of a coating film of a vehicle body, comprising:

a first step of detachably attaching a nonpolar resin plate to a position on a dummy vehicle body corresponding to a repair area comprising a coating film in need of repair;

a second step of supplying the dummy vehicle body to a topcoat application line that is the same as that for a vehicle body to be actually coated and forming either a pigment layer or a clear layer, or both of the pigment layer and the clear layer on the nonpolar resin plate under a condition equal to that for topcoat application to the vehicle body to be actually coated; and a third step of supplying the dummy vehicle body to a coating drying line that is the same as that for the vehicle body to be actually coated and drying the nonpolar resin plate having either the pigment layer or the clear layer formed thereon or having both of the pigment layer and the clear layer formed thereon under a condition equal to that for coating drying of the vehicle body to be actually coated.

2. The method for producing a repair sheet according to claim 1, wherein in the second step, when forming the pigment layer or both of the pigment layer and the clear layer on the nonpolar resin plate, the pigment layer is formed to have a varying thickness.

* * * * *